(12) United States Patent
Ono

(10) Patent No.: US 12,394,843 B2
(45) Date of Patent: Aug. 19, 2025

(54) SECONDARY BATTERY

(71) Applicant: MURATA MANUFACTURING CO., LTD., Kyoto (JP)

(72) Inventor: Takamasa Ono, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 504 days.

(21) Appl. No.: 18/089,200

(22) Filed: Dec. 27, 2022

(65) Prior Publication Data

US 2023/0131666 A1 Apr. 27, 2023

Related U.S. Application Data

(63) Continuation of application No. PCT/JP2021/009521, filed on Mar. 10, 2021.

(30) Foreign Application Priority Data

Jul. 17, 2020 (JP) ................................. 2020-122661

(51) Int. Cl.
*H01M 50/129* (2021.01)
*H01M 10/0525* (2010.01)
(Continued)

(52) U.S. Cl.
CPC ..... *H01M 50/129* (2021.01); *H01M 10/0525* (2013.01); *H01M 10/0569* (2013.01); *H01M 50/121* (2021.01); *H01M 2300/0028* (2013.01)

(58) Field of Classification Search
CPC ............. H01M 50/129; H01M 50/121; H01M 10/0525; H01M 10/0569
See application file for complete search history.

(56) References Cited

U.S. PATENT DOCUMENTS 6,461,757 B1 * 10/2002 Sasayama ........... H01M 50/121
 429/211
2007/0196732 A1 * 8/2007 Tatebayashi ........ H01M 50/528
 429/162

(Continued)

FOREIGN PATENT DOCUMENTS

JP 2000156209 A * 6/2000
JP 2000277066 A 10/2000

(Continued)

OTHER PUBLICATIONS

Machine Translation of JP-2000156209-A (Jul. 3, 2025) (Year: 2025).*

(Continued)

*Primary Examiner* — Matthew J Merkling
(74) *Attorney, Agent, or Firm* — K&L Gates LLP

(57) ABSTRACT

A secondary battery includes outer package members each having flexibility and a battery device. The outer package members each include a thermal-fusion-bonding layer. The battery device is contained in an inside of the outer package members, and includes a positive electrode, a negative electrode, and an electrolytic solution. The outer package members are sealed at a thermal-fusion-bonding part. The thermal-fusion-bonding part is formed by the thermal-fusion-bonding layers being thermal-fusion-bonded to each other. The thermal-fusion-bonding layer includes polypropylene. The electrolytic solution includes a solvent and an electrolyte salt. The solvent includes a chain carboxylic acid ester. The thermal-fusion-bonding layer has a thickness of greater than or equal to 25 μm and less than or equal to 60 μm. The thermal-fusion-bonding part has a length of greater than or equal to 160 mm and less than or equal to 650 mm. The thermal-fusion-bonding part has a width of greater than or equal to 3 mm and less than or equal to 6 mm.

4 Claims, 3 Drawing Sheets

(51) Int. Cl.
  *H01M 10/0569* (2010.01)
  *H01M 50/121* (2021.01)

(56) References Cited

U.S. PATENT DOCUMENTS

| | | | | |
|---|---|---|---|---|
| 2008/0299451 | A1* | 12/2008 | Funahashi | H01M 10/0585 |
| | | | | 429/185 |
| 2016/0268557 | A1 | 9/2016 | Sohn et al. | |
| 2016/0315301 | A1* | 10/2016 | Kim | H01M 50/3425 |
| 2016/0329546 | A1 | 11/2016 | Ham et al. | |
| 2018/0175451 | A1* | 6/2018 | Inoue | H01M 50/14 |
| 2020/0185668 | A1* | 6/2020 | Levin | H01M 50/119 |

FOREIGN PATENT DOCUMENTS

| | | | |
|---|---|---|---|
| JP | 2001283800 | A * | 10/2001 |
| JP | 2006236857 | A * | 9/2006 |
| JP | 2007087652 | A * | 4/2007 |
| JP | 2010086744 | A | 4/2010 |
| JP | 2016171060 | A | 9/2016 |
| JP | 2017027700 | A | 2/2017 |

OTHER PUBLICATIONS

Machine Translation of JP-2001283800-A (Jul. 3, 2025) (Year: 2025).*
Machine Translation of JP-2006236857-A (Jul. 3, 2025) (Year: 2025).*
Machine translation of JP-2007087652-A (Jul. 3, 2025) (Year: 2025).*
International Search Report of corresponding PCT application PCT/JP2021/009521, dated Jun. 1, 2021.

* cited by examiner

SECONDARY BATTERY

CROSS REFERENCE TO RELATED APPLICATIONS

The present application is a continuation of PCT application no. PCT/JP2021/009521, filed on Mar. 10, 2021, which claims priority to Japanese patent application no. JP2020-122661, filed on Jul. 17, 2020, the entire contents of which are herein incorporated by reference.

BACKGROUND

The present technology relates to a secondary battery.

Various kinds of electronic equipment, including mobile phones, have been widely used. Such widespread use has promoted development of a secondary battery as a power source that is smaller in size and lighter in weight and allows for a higher energy density.

The secondary battery includes a battery device. The battery device includes a positive electrode, a negative electrode, and an electrolytic solution. The secondary battery in which an outer package member having flexibility contains the battery device therein is known as a secondary battery.

A configuration of the secondary battery including the outer package member having flexibility has been considered in various ways. Specifically, in order to achieve superior heat resistance, a secondary battery includes a packing material for an electro-chemical cell, and the packing material has a multilayer structure including a thermal adhesive resin layer (polypropylene). Further, in order to achieve a superior longtime storage property, a secondary battery including a bag-like unit cell case is provided with a resin block in an inside end of a welding part of the bag-like unit cell case.

SUMMARY

The present technology relates to a secondary battery.

Consideration has been given in various ways of a secondary battery including an outer package member having flexibility; however, the secondary battery still remains insufficient in a cyclability characteristic, a swelling characteristic, and an electric resistance characteristic. Accordingly, there is still room for improvement in terms thereof.

The present technology has been made in view of such an issue and to provide a secondary battery that is able to achieve a superior cyclability characteristic, a superior swelling characteristic, and a superior insulating characteristic according to an embodiment.

A secondary battery according to an embodiment includes outer package members each having flexibility and a battery device. The outer package members each include a thermal-fusion-bonding layer. The battery device is contained in an inside of the outer package members, and includes a positive electrode, a negative electrode, and an electrolytic solution. The outer package members are sealed at a thermal-fusion-bonding part. The thermal-fusion-bonding part is formed by the thermal-fusion-bonding layers being thermal-fusion-bonded to each other. The thermal-fusion-bonding layer includes polypropylene. The electrolytic solution includes a solvent and an electrolyte salt. The solvent includes a chain carboxylic acid ester. The thermal-fusion-bonding layer has a thickness of greater than or equal to 25 μm and less than or equal to 60 μm. The thermal-fusion-bonding part has a length of greater than or equal to 160 mm and less than or equal to 650 mm. The thermal-fusion-bonding part has a width of greater than or equal to 3 mm and less than or equal to 6 mm. A dimensional ratio defined by the thickness of the thermal-fusion-bonding layer, the length of the thermal-fusion-bonding part, and the width of the thermal-fusion-bonding part satisfies a condition represented by Expression (1). A drawn amount of the outer package members is less than or equal to 7.8 mm. A content of the chain carboxylic acid ester in the solvent is greater than or equal to 30 vol % and less than or equal to 60 vol %.

$$0.16 \leq (T \times L)/W \leq 0.32 \tag{1}$$

Where:
(T×L)/W is the dimensional ratio;
T is the thickness (cm) of the thermal-fusion-bonding layer;
L is the length (cm) of the thermal-fusion-bonding part; and
W is the width (cm) of the thermal-fusion-bonding part.

Respective definitions of the "thickness of the thermal-fusion-bonding layer", the "length of the thermal-fusion-bonding part", the "width of the thermal-fusion-bonding part", and the "drawn amount of the outer package members" will be described later.

According to the secondary battery of an embodiment, the outer package members (each in which the thermal-fusion-bonding layer includes polypropylene) having flexibility contains the battery device (in which the solvent of the electrolytic solution includes the chain carboxylic acid ester) therein, and is sealed at the thermal-fusion-bonding part. Further, the above-described condition is satisfied in terms of the thickness of the thermal-fusion-bonding layer, the length and the width of the thermal-fusion-bonding part, the dimensional ratio defined by the thickness, the length, and the width, the drawn amount of the outer package members, and the content of the chain carboxylic acid ester in the solvent. Accordingly, it is possible to achieve a superior cyclability characteristic, a superior swelling characteristic, and a superior insulating characteristic.

Note that effects of the present technology are not necessarily limited to those described herein and may include any of a series of suitable effects.

DETAILED DESCRIPTION

One or more embodiments of the present technology are described below in further detail including with reference to the drawings.

A description is given first of a secondary battery according to an embodiment.

The secondary battery to be described here is a secondary battery that obtains a battery capacity using insertion and extraction of an electrode reactant, and includes a positive electrode, a negative electrode, and an electrolytic solution which is a liquid electrolyte. In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is set to be greater than an electrochemical capacity per unit area of the positive electrode.

Although not particularly limited in kind, the electrode reactant is specifically a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 1:
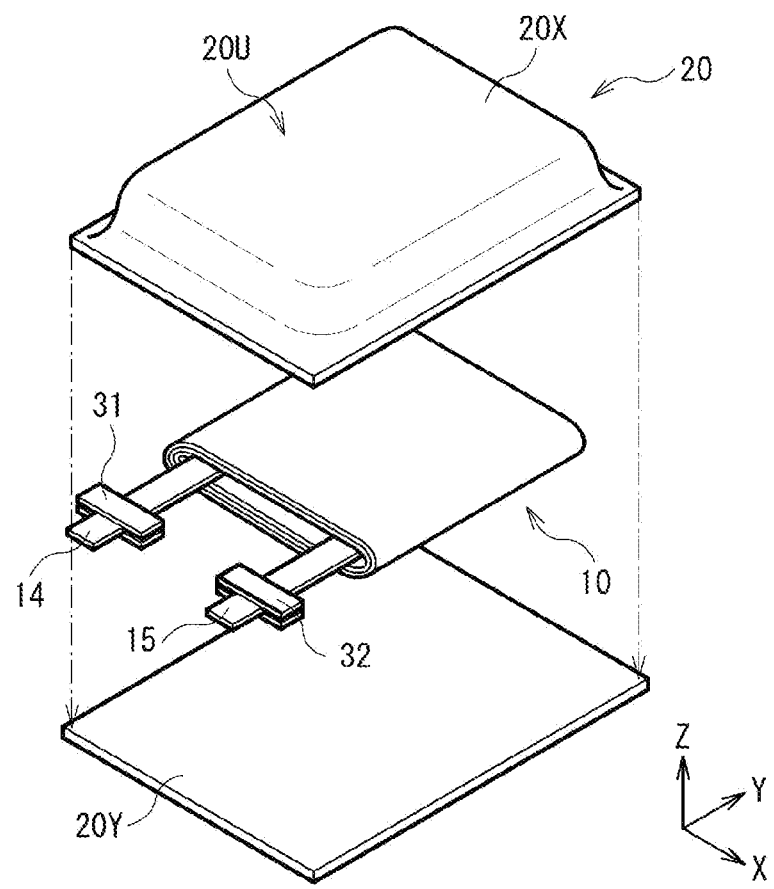
FIG. 1 is a perspective view of a configuration of a secondary battery according to an embodiment.
Figure 2:
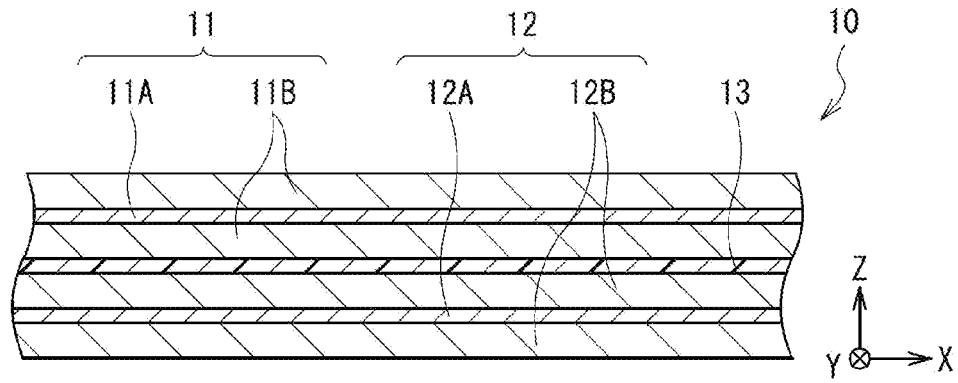
FIG. 2 is a sectional view of a configuration of a battery device illustrated in FIG. 1.

FIG. 1 illustrates a perspective configuration of the secondary battery. FIG. 2 illustrates a sectional configuration of a battery device 10 illustrated in FIG. 1. Note that FIG. 1 illustrates a state in which the battery device 10 and an outer package film 20 are separated away from each other. FIG. 2 illustrates only a portion of the battery device 10.

As illustrated in FIG. 1, the secondary battery includes the battery device 10, the outer package film 20, a positive electrode lead 14, and a negative electrode lead 15. The secondary battery described here is a secondary battery of a laminated-film type. The secondary battery of the laminated-film type includes outer package members each having flexibility or softness, that is, the outer package film 20, as outer package members to contain the battery device 10.

As illustrated in FIG. 1, the outer package film 20 includes two film-shaped members (an upper film 20X and a lower film 20Y) and is made into a pouch-shaped structure by the upper film 20X and the lower film 20Y being joined (thermal-fusion-bonded) to each other. The outer package film 20 contains the battery device 10 as described above, and thus contains a positive electrode 11, a negative electrode 12, and an electrolytic solution that are to be described later. The upper film 20X has a depression part 20U to place the battery device 10 therein. The depression part 20U is a so-called deep drawn part.

A sealing film 31 is interposed between the upper film 20X and the positive electrode lead 14, and another sealing film 31 is interposed between the lower film 20Y and the positive electrode lead 14. A sealing film 32 is interposed between the upper film 20X and the negative electrode lead 15, and another sealing film 32 is interposed between the lower film 20Y and the negative electrode lead 15. The sealing film 31 and the sealing film 32 are members that each prevent entry of outside air into the outer package film 20. The sealing film 31 includes one or more of polymer compounds including, without limitation, a polyolefin that have adherence to the positive electrode lead 14. The sealing film 32 includes one or more of polymer compounds including, without limitation, a polyolefin that have adherence to the negative electrode lead 15. Examples of the polyolefin include polyethylene, polypropylene, modified polyethylene, and modified polypropylene. Note that the sealing film 31, the sealing film 32, or both may be omitted.

A detailed configuration of the outer package film 20 (including the upper film 20X and the lower film 20Y) will be described later with reference to FIGS. 3 and 4.

As illustrated in FIGS. 1 and 2, the battery device 10 is contained inside the outer package film 20, and includes the positive electrode 11, the negative electrode 12, a separator 13, and the electrolytic solution (not illustrated). The positive electrode 11, the negative electrode 12, and the separator 13 are each impregnated with the electrolytic solution.

The battery device 10 is a wound electrode body, that is, a structure in which the positive electrode 11 and the negative electrode 12 are stacked on each other with the separator 13 interposed therebetween, and the stack of the positive electrode 11, the negative electrode 12, and the separator 13 is wound about a winding axis. Accordingly, the positive electrode 11 and the negative electrode 12 are opposed to each other with the separator 13 interposed therebetween, and the stack of the positive electrode 11, the negative electrode 12, and the separator 13 is wound. The winding axis is a virtual axis extending in a Y-axis direction.

The battery device 10 has an elongated three-dimensional shape. In other words, a section of the battery device 10 intersecting the winding axis, that is, a section of the battery device 10 along an XZ plane, has an elongated shape defined by a major axis and a minor axis, and more specifically, has an elongated, substantially elliptical shape. The major axis is a virtual axis that extends in an X-axis direction and has a length larger than that of the minor axis. The minor axis is a virtual axis that extends in a Z-axis direction intersecting the X-axis direction and has a length smaller than that of the major axis.

As illustrated in FIG. 2, the positive electrode 11 includes a positive electrode current collector 11A having two opposed surfaces, and two positive electrode active material layers 11B disposed on the respective two opposed surfaces of the positive electrode current collector 11A. Note that the positive electrode active material layer 11B may be disposed only on one surface, out of the two opposed surfaces of the positive electrode current collector 11A, on a side where the positive electrode 11 is opposed to the negative electrode 12.

The positive electrode current collector 11A includes one or more of electrically conductive materials including, without limitation, a metal material. Examples of the metal material include aluminum, nickel, and stainless steel. The positive electrode active material layer 11B includes one or more of positive electrode active materials into which lithium is insertable and from which lithium is extractable. The positive electrode active material layer 11B may further include, for example, a positive electrode binder and a positive electrode conductor.

The positive electrode active material is not particularly limited in kind, and specific examples thereof include a lithium-containing compound such as a lithium-transition-metal compound. The lithium-transition-metal compound is a compound including lithium and one or more transition metal elements. The lithium-transition-metal compound may further include one or more other elements. The other elements may be any elements other than transition metal elements, and are not particularly limited in kind. Specifically, however, the other elements are elements belonging to groups 2 to 15 in the long period periodic table of elements. The lithium-transition-metal compound is not particularly limited in kind, and specific examples thereof include an oxide, a phosphoric acid compound, a silicic acid compound, and a boric acid compound.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, and LiMn$_2$O$_4$. Specific examples of the phosphoric acid compound include LiFePO$_4$, LiMnPO$_4$, LiFe$_{0.5}$Mn$_{0.5}$PO$_4$, and LiFe$_{0.3}$Mn$_{0.7}$PO$_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. The electrically conductive material may be a metal material or a polymer compound, for example.

A method of forming the positive electrode active material layer 11B is not particularly limited, and specifically includes one or more of methods including, without limitation, a coating method.

As illustrated in FIG. 2, the negative electrode 12 includes a negative electrode current collector 12A having two opposed surfaces, and two negative electrode active material layers 12B disposed on the respective two opposed surfaces of the negative electrode current collector 12A. Note that the negative electrode active material layer 12B may be disposed only on one surface, out of the two opposed surfaces of the negative electrode current collector 12A, on a side where the negative electrode 12 is opposed to the positive electrode 11.

The negative electrode current collector 12A includes one or more of electrically conductive materials including, without limitation, a metal material. Examples of the metal material include copper, aluminum, nickel, and stainless steel. The negative electrode active material layer 12B includes one or more of negative electrode active materials into which lithium is insertable and from which lithium is extractable. The negative electrode active material layer 12B may further include, for example, a negative electrode binder and a negative electrode conductor. Details of the negative electrode binder are similar to those of the positive electrode binder. Details of the negative electrode conductor are similar to those of the positive electrode conductor.

The negative electrode active material is not particularly limited in kind, and specifically includes, for example, a carbon material, a metal-based material, or both. Examples of the carbon material include graphitizable carbon, non-graphitizable carbon, and graphite. Examples of the graphite include natural graphite and artificial graphite. The metal-based material is a material that includes one or more elements among metal elements and metalloid elements that are each able to form an alloy with lithium. Such metal elements and metalloid elements include silicon, tin, or both. The metal-based material may be a simple substance, an alloy, a compound, a mixture of two or more thereof, or a material including two or more phases thereof.

Specific examples of the metal-based material include SiB$_4$, SiB$_6$, Mg$_2$Si, Ni$_2$Si, TiSi$_2$, MoSi$_2$, CoSi$_2$, NiSi$_2$, CaSi$_2$, CrSi$_2$, Cu$_5$Si, FeSi$_2$, MnSi$_2$, NbSi$_2$, TaSi$_2$, VSi$_2$, WSi$_2$, ZnSi$_2$, SiC, Si$_3$N$_4$, Si$_2$N$_2$O, SiO$_v$ (0<v≤2), LiSiO, SnO$_w$ (0<w≤2), SnSiO$_3$, LiSnO, and Mg$_2$Sn. Note that "v" of SiO$_v$ may satisfy 0.2<v<1.4.

A method of forming the negative electrode active material layer 12B is not particularly limited, and specifically includes one or more of methods including, without limitation, a coating method, a vapor-phase method, a liquid-phase method, a thermal spraying method, and a firing (sintering) method.

The separator 13 is an insulating porous film interposed between the positive electrode 11 and the negative electrode 12 as illustrated in FIG. 2. The separator 13 prevents contact (a short circuit) between the positive electrode 11 and the negative electrode 12, and allows lithium ions to pass therethrough. The separator 13 includes one or more of polymer compounds including, without limitation, polytetrafluoroethylene, polypropylene, and polyethylene.

The electrolytic solution includes one or more of chain carboxylic acid esters. The "chain carboxylic acid ester" is a straight-chain saturated fatty acid ester.

More specifically, the electrolytic solution includes a solvent and an electrolyte salt. The solvent includes the chain carboxylic acid ester. An electrolytic solution including the chain carboxylic acid ester which is a non-aqueous solvent (an organic solvent) is a so-called non-aqueous electrolytic solution.

A reason why the electrolytic solution (the solvent) includes the chain carboxylic acid ester is that this suppresses swelling of the secondary battery. In more detail, the chain carboxylic acid ester has a property of suppressing gas generation due to a decomposition reaction upon charging and discharging as compared with, for example, a cyclic carbonic acid ester and a chain carbonic acid ester to be described later. The electrolytic solution including the chain carboxylic acid ester thus prevents a decomposition reaction of the chain carboxylic acid ester from proceeding easily upon charging and discharging, which suppresses gas generation due to the decomposition reaction of the chain carboxylic acid ester. This prevents gas from accumulating easily inside the outer package film 20 having a pouch shape, and thus suppresses the swelling of the secondary battery.

Specific examples of the chain carboxylic acid ester include, without particular limitation, methyl acetate, ethyl acetate, methyl propionate, ethyl propionate, propyl propionate, and ethyl trimethyl acetate.

Note that a content of the chain carboxylic acid ester in the solvent is within a range from 30 vol % to 60 vol % both inclusive. A reason for this is that the swelling of the secondary battery is sufficiently suppressed. Another reason for this is that an amount of permeation of the chain carboxylic acid ester into a thermal-fusion-bonding layer 21 to be described later is reduced, which secures a sealing property of the outer package film 20.

The content of the chain carboxylic acid ester described here is a value obtained by analyzing the electrolytic solution by high frequency inductively coupled plasma (ICP) optical emission spectroscopy after the secondary battery is completed.

Note that the solvent may include, together with the chain carboxylic acid ester, one or more of other solvents (non-aqueous solvents).

Examples of the other solvent include esters and ethers. However, the chain carboxylic acid ester described above is excluded from the esters to be described below.

Examples of the esters include a carbonic-acid-ester-based compound. Examples of the carbonic-acid-ester-based compound include a cyclic carbonic acid ester and a chain carbonic acid ester. Specific examples of the cyclic carbonic acid ester include ethylene carbonate and propylene carbonate. Specific examples of the chain carbonic acid ester include dimethyl carbonate, diethyl carbonate, and methyl ethyl carbonate.

Examples of the ethers include a lactone-based compound. Examples of the lactone-based compound include a lactone. Specific examples of the lactone include γ-butyrolactone and γ-valerolactone. Examples of the ethers other than the compounds described above may include 1,2-dimethoxyethane, tetrahydrofuran, 1,3-dioxolane, and 1,4-dioxane.

A content (vol %) of the other solvent included in the solvent is not particularly limited, and may thus be set as desired in accordance with the content of the chain carboxylic acid ester in the solvent described above.

The solvent may further include one or more of additives. Examples of the additive include an unsaturated cyclic carbonic acid ester, a halogenated carbonic acid ester, a sulfonic acid ester, a phosphoric acid ester, an acid anhydride, a nitrile compound, and an isocyanate compound. A reason for this is that chemical stability of the electrolytic solution improves. Note that a content of the additive in the electrolytic solution is not particularly limited, and may thus be set as desired.

Specifically, examples of the unsaturated cyclic carbonic acid ester include vinylene carbonate (1,3-dioxol-2-one), vinyl ethylene carbonate (4-vinyl-1,3-dioxolane-2-one), and methylene ethylene carbonate (4-methylene-1,3-dioxolane-2-one). Examples of the halogenated carbonic acid ester include fluoroethylene carbonate (4-fluoro-1,3-dioxolane-2-one) and difluoroethylene carbonate (4,5-difluoro-1,3-dioxolane-2-one). Examples of the sulfonic acid ester include 1,3-propanesultone. Examples of the phosphoric acid ester include trimethyl phosphate and triethyl phosphate.

Examples of the acid anhydride include a cyclic dicarboxylic acid anhydride, a cyclic disulfonic acid anhydride, and a cyclic carboxylic acid sulfonic acid anhydride. Examples of the cyclic dicarboxylic acid anhydride include succinic anhydride, glutaric anhydride, and maleic anhydride. Examples of the cyclic disulfonic acid anhydride include ethanedisulfonic anhydride and propanedisulfonic anhydride. Examples of the cyclic carboxylic acid sulfonic acid anhydride include sulfobenzoic anhydride, sulfopropionic anhydride, and sulfobutyric anhydride.

Examples of the nitrile compound include acetonitrile, succinonitrile, and adiponitrile. Examples of the isocyanate compound include hexamethylene diisocyanate.

The electrolyte salt includes one or more of light metal salts including, without limitation, a lithium salt. Examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethanesulfonyl)imide ($LiN(CF_3SO_2)_2$), lithium tris(trifluoromethanesulfonyl)methide ($LiC(CF_3SO_2)_3$), and lithium bis(oxalato)borate ($LiB(C_2O_4)_2$).

A content of the electrolyte salt is not particularly limited, and specifically, is within a range from 0.3 mol/kg to 3.0 mol/kg both inclusive with respect to the solvent. A reason for this is that a high ionic conductivity is obtainable.

The positive electrode lead 14 is a positive electrode terminal coupled to the positive electrode 11 (the positive electrode current collector 11A), and includes one or more of electrically conductive materials including, without limitation, aluminum. The negative electrode lead 15 is a negative electrode terminal coupled to the negative electrode 12 (the negative electrode current collector 12A), and includes one or more of electrically conductive materials including, without limitation, copper, nickel, and stainless steel. A shape of each of the positive electrode lead 14 and the negative electrode lead 15 is one or more of shapes including, without limitation, a thin plate shape and a meshed shape.

Here, as illustrated in FIG. 1, the positive electrode lead 14 and the negative electrode lead 15 are led out in respective directions that are common to each other, from an inside to an outside of the outer package film 20. Note that the positive electrode lead 14 and the negative electrode lead 15 may be led out in respective directions that are different from each other.

Here, the number of the positive electrode leads 14 is one. The number of the positive electrode leads 14 is, however, not particularly limited, and may be two or more. In particular, if the number of the positive electrode leads 14 is two or more, the secondary battery decreases in electrical resistance. The description given here in relation to the number of the positive electrode leads 14 also applies to the number of the negative electrode leads 15. Accordingly, the number of the negative electrode leads 15 is not limited to one, and may be two or more.

Figure 3:
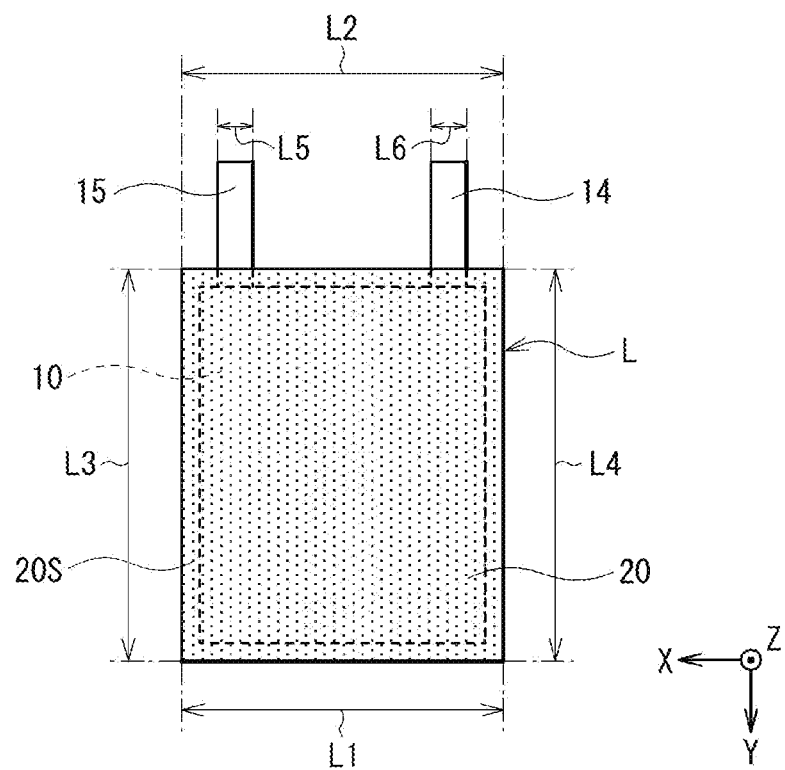
FIG. 3 is a plan view of the configuration of the secondary battery illustrated in FIG. 1.

FIG. 3 illustrates a plan configuration of the secondary battery illustrated in FIG. 1. FIG. 4 illustrates a sectional configuration of the secondary battery illustrated in FIG. 1. Note that, in FIG. 3, the outer package film 20 is shaded and illustrations of the sealing films 31 and 32 are omitted. FIG. 4 illustrates only a portion of the outer package film 20 (a portion near a thermal-fusion-bonding part 20S to be described later). In the following, where appropriate, reference will be made to FIGS. 1 and 2 which have already been described.

Here, as described above, the outer package film 20 includes the upper film 20X and the lower film 20Y. In the outer package film 20, the upper film 20X and the lower film 20Y are overlapped on each other. In such a state, respective outer edge parts of two opposed portions are joined (thermal-fusion-bonded) to each other. The outer package film 20 is thus made into a pouch-shaped hermetically closed (sealed) structure.

Figure 4:
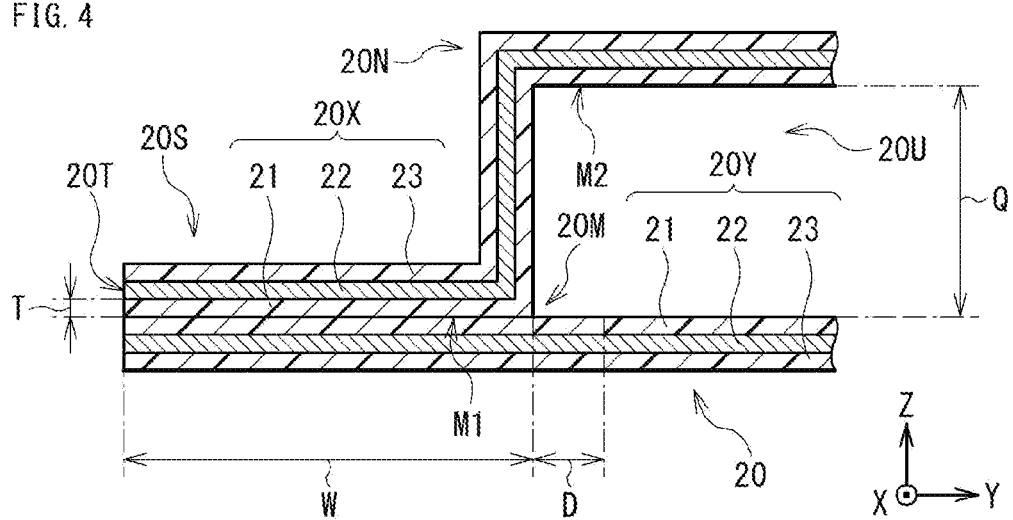
FIG. 4 is a sectional view of the configuration of the secondary battery illustrated in FIG. 1.

More specifically, the outer package film 20 includes the thermal-fusion-bonding layers 21; in other words, the upper film 20X and the lower film 20Y include the respective thermal-fusion-bonding layers 21, as illustrated in FIGS. 3 and 4. Thus, in the state in which the upper film 20X and the lower film 20Y are overlapped on each other, the respective outer edge parts of the thermal-fusion-bonding layers 21 opposed to each other are thermal-fusion-bonded to each other. Accordingly, the outer package film 20 has the thermal-fusion-bonding part 20S which is formed by the thermal-fusion-bonding layers 21 being thermal-fusion-bonded to each other, and is thus sealed at the thermal-fusion-bonding part 20S. Owing to the respective outer edge parts of the thermal-fusion-bonding layers 21 being thermal-fusion-bonded to each other, the thermal-fusion-bonding part 20S is thus formed on an outer edge part of the outer package film 20.

Here, the outer package film 20 is a laminated film including the thermal-fusion-bonding layer 21, and thus has a multilayer structure in which the thermal-fusion-bonding layer 21 is included. A reason for this is that the sealing property of the outer package film 20 improves. As a result, an external component such as water is prevented from easily entering the inside from the outside of the outer package film 20, and an internal component such as a volatile matter of the electrolytic solution is prevented from being released easily to the outside from the inside of the outer package film 20.

In particular, it is preferable that the outer package film 20 have a multilayer structure in which the thermal-fusion-bonding layer 21, a metal layer 22, and a protective layer 23 are stacked in this order, and that the thermal-fusion-bonding layer 21, the metal layer 22, and the protective layer 23 be disposed in this order from an inner side. A reason for this is that the sealing property of the outer package film 20 further improves.

In this case, as illustrated in FIG. 4, the thermal-fusion-bonding part 20S has a multilayer structure in which the upper film 20X and the lower film 20Y of the outer package film 20 are thermal-fusion-bonded to each other by making use of the thermal-fusion-bonding layers 21. More specifically, the thermal-fusion-bonding part 20S has a six-layer structure in which the protective layer 23, the metal layer 22, the thermal-fusion-bonding layer 21, the thermal-fusion-bonding layer 21, the metal layer 22, and the protective layer 23 are stacked in this order, and the thermal-fusion-bonding layers 21 adjacent to each other are thermal-fusion-bonded to each other.

The thermal-fusion-bonding layer 21 is a layer that is able to be thermal-fusion-bonded by a thermal-fusion-bonding method and includes polypropylene which is a polymer compound having an insulating property. Note that polypropylene may be unmodified polypropylene, modified polypropylene, or both.

As described above, the thermal-fusion-bonding layers 21 adjacent to each other are thermal-fusion-bonded to each other to thereby serve to seal the outer package film 20. Further, the thermal-fusion-bonding layer 21 is interposed between the positive electrode lead 14 and the metal layer 22 to thereby serve to prevent a short circuit between the positive electrode lead 14 and the metal layer 22, and is interposed between the negative electrode lead 15 and the metal layer 22 to thereby serve to prevent a short circuit between the negative electrode lead 15 and the metal layer 22.

The metal layer 22 is a barrier layer that blocks, for example, a liquid component and a gas component, and includes one or more of metal materials. Specific examples of the metal material include aluminum. The liquid component is not particularly limited in kind, and specific examples thereof include water described above. The gas component is not particularly limited in kind, and specific examples thereof include the volatile matter of the electrolytic solution described above.

The metal layer 22 is interposed between the thermal-fusion-bonding layer 21 and the protective layer 23 to thereby serve to substantially shield the outer package film 20. This prevents the liquid component and the gas component from easily passing (entering and being released) through the outer package film 20 (excluding the thermal-fusion-bonding part 20S), as described above. Accordingly, a hermetically closed property of the outer package film 20 is secured.

The protective layer 23 is a surface protective layer that is an outermost layer of the outer package film 20, and includes one or more of polymer compounds each having an insulating property. Specific examples of the polymer compound include nylon.

The protective layer 23 covers a surface of the metal layer 22 to thereby serve to protect the metal layer 22, that is, to prevent damage and corrosion of the metal layer 22.

Here, owing to the electrolytic solution including the chain carboxylic acid ester, a series of dimension parameters related to the configuration of the outer package film 20 (the thermal-fusion-bonding part 20S) is made appropriate in order to improve the sealing property of the outer package film 20.

Specifically, as illustrated in FIGS. 3 and 4, a dimensional ratio defined by a thickness T (cm) of the thermal-fusion-bonding layer 21, a length L (cm) of the thermal-fusion-bonding part 20S, and a width W (cm) of the thermal-fusion-bonding part 20S satisfies a condition represented by Expression (1). Note that the thickness T is within a range from 25 μm to 60 μm both inclusive, the length L is within a range from 160 mm to 650 mm both inclusive, and the width W is within a range from 3 mm to 6 mm both inclusive. A reason for this is that the sealing property of the outer package film 20 improves, as described above. In this case, a total thickness of the outer package film 20 does not become too large. This prevents the short circuit between the positive electrode lead 14 and the metal layer 22 and the short circuit between the negative electrode lead 15 and the metal layer 22 while an energy density per unit volume is secured.

$$0.16 \leq (T \times L)/W \leq 0.32 \tag{1}$$

Where:
(T×L)/W is the dimensional ratio;
T is the thickness (cm) of the thermal-fusion-bonding layer;
L is the length (cm) of the thermal-fusion-bonding part; and
W is the width (cm) of the thermal-fusion-bonding part.

The thickness T is, as illustrated in FIG. 4, a thickness of the thermal-fusion-bonding layer 21 at an end part 20T on an outer side of the thermal-fusion-bonding part 20S, in other words, a thickness of the thermal-fusion-bonding layer 21 exposed to the outside in the thermal-fusion-bonding part 20S. The thickness T is a smallest value out of respective ten thicknesses measured at any ten points that differ from each other. Note that a value of the thickness T is rounded off to the nearest whole number.

The length L is a length of the thermal-fusion-bonding part 20S, in other words, a length of a portion where the thermal-fusion-bonding layers 21 are thermal-fusion-bonded to each other, and thus is a dimension of an outer periphery of the thermal-fusion-bonding part 20S, as illustrated in FIG. 3.

Note that a value the flow L is rounded off to the nearest whole number. Further, the length of the portion where the thermal-fusion-bonding layers 21 are thermal-fusion-bonded to each other does not include a length of a portion occupied by the positive electrode lead 14 and a length of a portion occupied by the negative electrode lead 15. In other words, the respective lengths of the portion occupied by the positive electrode lead 14 and the portion occupied by the negative electrode lead 15 are excluded from the length of the portion where the thermal-fusion-bonding layers 21 are thermal-fusion-bonded to each other.

More specifically, in a case where a plan shape of the outer package film 20 (each of the upper film 20X and the lower film 20Y) is rectangular, the outer package film 20 has four sides (two sides that are opposed to each other and other two sides that are opposed to each other).

In this case, the length L is a value obtained by subtracting a length L5 of the positive electrode lead 14 and a length L6 of the negative electrode lead 15 from a sum of lengths L1 and L2 of the respective two sides (a lower side and an upper side) that are opposed to each other and lengths L3 and L4 of the respective other two sides (a left side and a right side)

that are opposed to each other. In other words, the length L is represented by L=(L1+L2+L3+L4)−(L5+L6).

The width W is, as illustrated in FIG. 4, a dimension of the thermal-fusion-bonding part 20S in a direction (the Y-axis direction) from the outside toward the inside of the outer package film 20. Note that a value of the width W is rounded off to the nearest whole number.

More specifically, the upper film 20X extends from the outside toward the inside of the outer package film 20 and is bent in a direction away from the lower film 20Y at some midpoint to form the depression part 20U. In this case, the width W is a dimension determined on the basis of a position (a bent part 20M) at which the upper film 20X is bent, and is therefore a distance from the end part 20T to the bent part 20M. The width W is a smallest value out of respective ten widths measured at any ten points that differ from each other.

In Expression (1), "T" is the thickness of the thermal-fusion-bonding layer 21 (the thickness of the thermal-fusion-bonding layer 21 at the end part 20T) exposed to the outside in the thermal-fusion-bonding part 20S. Accordingly, "T×L" represents an exposed area of the thermal-fusion-bonding layer 21 at the end part 20T. Therefore, "(T×L)/W" represents a ratio of the exposed area of the thermal-fusion-bonding layer 21 to the width W of the thermal-fusion-bonding part 20S.

In other words, as described above, considering that the liquid component and the gas component can move into and out of (enter or being released from) the outer package film 20 via the thermal-fusion-bonding layer 21, the "exposed area of the thermal-fusion-bonding layer 21" is an area of an entrance where the liquid component and the gas component move in and out, and the "width W of the thermal-fusion-bonding part 20S" is a distance of a path for the liquid component and the gas component to move in the thermal-fusion-bonding layer 21 to thereby move in and out in the thermal-fusion-bonding part 20S.

The dimensional ratio ((T×L)/W) is, as described above, a parameter that defines the sealing property of the outer package film 20. The dimensional ratio described here will be referred to as a "sealing ratio R" hereinafter. Note that a value of (T×L) and a value of the sealing ratio R are each rounded off to two decimal places.

With regard to the configuration of the outer package film 20, not only the thickness T, the length L, the width W, and the sealing ratio R described above, but also a drawn amount Q (mm) is made appropriate in order to improve the sealing property. The drawn amount Q is a dimension parameter that defines a three-dimensional shape of the outer package film 20, more specifically a three-dimensional shape of the upper film 20X having the depression part 20U. In other words, the drawn amount Q is a depth of the depression part 20U, more specifically a distance (a height difference) between an upper surface M1 and a lower surface M2 in a portion where the upper film 20X is bent to form the depression part 20U, and is less than or equal to 7.8 mm. A reason for this that the sealing property further improves as described above. In this case, even if the upper film 20X is bent to form the depression part 20U, the upper film 20X is prevented from being damaged or broken easily, which secures the hermetically closed property of the outer package film 20. Note that a value of the drawn amount Q is rounded off to one decimal place.

In particular, in a case where the outer package film 20 (the upper film 20X) is a laminated film including the metal layer 22 and if the drawn amount Q is too large, the thickness of the metal layer 22 has to be reduced in order to form the depression part 20U or to bend the upper film 20X. This makes the metal layer 22 easily damaged (a so-called crack occurs) or broken by a shock applied thereto. Accordingly, the hermetically closed property of the outer package film decreases, which allows the liquid component and the gas component to enter the inside of the outer package film 20 easily. However, even in the case where the outer package film 20 is a laminated film including the metal layer 22, the metal layer 22 is prevented from being damaged or broken easily if the drawn amount Q is within the above-described range. Accordingly, the hermetically closed property of the outer package film 20 is secured, which prevents the liquid component and the gas component from easily entering the inside of the outer package film 20.

A procedure of measuring the drawn amount Q is as described below. In the following, a case will be described where the drawn amount Q is measured by unillustrated two measurement jigs. Here, each of the two measurement jigs is a plate-shaped member having an opening.

First, after preparing the upper film 20X having the depression part 20U, the upper film 20X is sandwiched by the two measurement jigs. More specifically, the upper film 20X is placed on one measurement jig, and the other measuring jig is thereafter placed on the upper film 20X.

In this case, a portion corresponding to the depression part 20U of the upper film 20X, that is, a portion protruding in a depth direction of the depression part 20U, is put through the opening of one of the measurement jigs. The upper film 20X is thereby disposed on the one measurement jig in such a manner that the protruding portion faces downwards.

Further, the other measurement jig is placed on the upper film 20X in such a manner as not to cover the depression part 20U. Accordingly, the depression part 20U is exposed in the openings of the respective measurement jigs even if the upper film 20X is sandwiched by the two measurement jigs.

Thereafter, the depth (mm) of the depression part 20U is measured by a measurement instrument such as a caliper.

In this case, the depth can vary in the vicinity of the portion where the upper film 20X is bent (a bent part 20N) at a base of the depression part 20U due to variation in a bending condition of the upper film 20X. The "bending condition" includes, for example, a bending angle of the upper film 20X at the bent part 20N. Needless to say, in a case where the upper film 20X is curved at the bent part 20N, the bending condition also includes a curvature radius of the upper film 20X at the bent part 20N. Accordingly, in order to suppress influences of the depth variation, the depth is measured in a region on an inner side with respect to the bent part 20N by a distance D, in other words, a region away from the bent part 20N toward the inner side by the distance D. The distance D may be set as desired depending on the bending condition of the upper film 20X, and is, for example, 5 mm.

Thereafter, the depth is measured at each of multiple locations that differ from each other to thereby obtain multiple depths. Here, as described above, the plan shape of the upper film 20X is rectangular and has four corner parts. Accordingly, four depths are obtained by measuring the respective depths in the vicinity of the corner parts.

Lastly, the drawn amount Q (mm) is determined by calculating an average value of the four depths.

Upon charging the secondary battery, lithium is extracted from the positive electrode 11, and the extracted lithium is inserted into the negative electrode 12 via the electrolytic solution. Upon discharging the secondary battery, lithium is extracted from the negative electrode 12, and the extracted lithium is inserted into the positive electrode 11 via the electrolytic solution. Upon the charging and the discharging, lithium is inserted and extracted in an ionic state.

In a case of manufacturing the secondary battery, the positive electrode 11 and the negative electrode 12 are fabricated and the electrolytic solution is prepared, following which the secondary battery is fabricated using the positive electrode 11, the negative electrode 12, and the electrolytic solution, according to a procedure to be described below.

First, the positive electrode active material is mixed with other materials including, without limitation, the positive electrode binder and the positive electrode conductor to thereby obtain a positive electrode mixture. Thereafter, the positive electrode mixture is put into a solvent such as an organic solvent to thereby prepare a paste positive electrode mixture slurry. Lastly, the positive electrode mixture slurry is applied on the two opposed surfaces of the positive electrode current collector 11A to thereby form the positive electrode active material layers 11B. Thereafter, the positive electrode active material layers 11B may be compression-molded by means of, for example, a roll pressing machine. In this case, the positive electrode active material layers 11B may be heated. The positive electrode active material layers 11B may be compression-molded multiple times. In this manner, the positive electrode active material layers 11B are formed on the respective two opposed surfaces of the positive electrode current collector 11A. The positive electrode 11 is thus fabricated.

The negative electrode active material layers 12B are formed on the respective two opposed surfaces of the negative electrode current collector 12A by a procedure similar to the fabrication procedure of the positive electrode 11 described above. Specifically, the negative electrode active material is mixed with materials including, without limitation, the negative electrode binder and the negative electrode conductor on an as-needed basis to thereby obtain a negative electrode mixture. Thereafter, the negative electrode mixture is put into a solvent such as an organic solvent to thereby prepare a paste negative electrode mixture slurry. Thereafter, the negative electrode mixture slurry is applied on the two opposed surfaces of the negative electrode current collector 12A to thereby form the negative electrode active material layers 12B. Thereafter, the negative electrode active material layers 12B may be compression-molded as with the case of compression-molding the positive electrode active material layers 11B. In this manner, the negative electrode active material layers 12B are formed on the respective two opposed surfaces of the negative electrode current collector 12A. The negative electrode 12 is thus fabricated.

The electrolyte salt is put into the solvent including the chain carboxylic acid ester. The electrolyte salt is thereby dispersed or dissolved in the solvent. The electrolytic solution is thus prepared.

First, the positive electrode lead 14 is coupled to the positive electrode 11 (the positive electrode current collector 11A) by a method such as a welding method, and the negative electrode lead 15 is coupled to the negative electrode 12 (the negative electrode current collector 12A) by a method such as a welding method.

Thereafter, the positive electrode 11 and the negative electrode 12 are stacked on each other with the separator 13 interposed therebetween, following which the stack of the positive electrode 11, the negative electrode 12, and the separator 13 is wound to thereby fabricate a wound body. The wound body has a configuration similar to that of the battery device 10 except that the positive electrode 11, the negative electrode 12, and the separator 13 are each not impregnated with the electrolytic solution. Thereafter, the wound body is pressed by means of, for example, a pressing machine to thereby shape the wound body into an elongated shape.

Thereafter, the wound body is placed inside the depression part 20U. In such a state, the upper film 20X and the lower film 20Y are overlapped on each other, following which the outer edge part of three sides of the upper film 20X (the thermal-fusion-bonding layer 21) and the outer edge part of three sides of the lower film 20Y (the thermal-fusion-bonding layer 21) are thermal-fusion-bonded to each other by a thermal-fusion-bonding method to thereby contain the wound body inside the outer package film 20 having the pouch shape. In this case, the three-dimensional shape of the upper film 20X is adjusted in such a manner that the drawn amount Q satisfies the condition described above.

The drawn amount Q is adjustable by changing a condition of forming (molding) the upper film 20X. Specifically, in a process of forming the upper film 20X, an unillustrated raw material film is used to perform a process of molding the raw material film. In the molding process, the raw material film is sandwiched between a convex block and a concave block to thereby cause a portion of the raw material film to be molded into a concave shape. As a result, the depression part 20U is formed, and the upper film 20X having the depression part 20U is thus obtained. In this case, a height of the convex block and a depth of the concave block are each changed to thereby vary the depth of the depression part 20U. The drawn amount Q is thus adjusted.

Here, used as each of the upper film 20X and the lower film 20Y is a laminated film in which the thermal-fusion-bonding layer 21 including polypropylene, the metal layer 22, and the protective layer 23 are stacked in this order. Accordingly, the thermal-fusion-bonding layers 21 are thermal-fusion-bonded to each other.

Lastly, the electrolytic solution is injected into the outer package film 20 having the pouch shape, following which the outer edge part of the remaining one side of the upper film 20X (the thermal-fusion-bonding layer 21) and the outer edge part of the remaining one side of the lower film 20Y (the thermal-fusion-bonding layer 21) are thermal-fusion-bonded to each other by a method such as a thermal-fusion-bonding method. In this case, the sealing film 31 is interposed between the outer package film 20 and the positive electrode lead 14, and the sealing film 32 is interposed between the outer package film 20 and the negative electrode lead 15. The wound body is thereby impregnated with the electrolytic solution. Thus, the battery device 10 which is the wound electrode body is fabricated.

In this case in particular, the respective outer edge parts of the thermal-fusion-bonding layers 21 are thermal-fusion-bonded to each other on the four sides of the outer package film 20 (the upper film 20X and the lower film 20Y), and the thermal-fusion-bonding part 20S is thus formed. In this manner, the outer package film 20 is sealed at the thermal-fusion-bonding part 20S. In particular, in the case of forming the thermal-fusion-bonding part 20S, conditions including, without limitation, a thermal-fusion-bonding range are adjusted in such a manner that the thickness T of the thermal-fusion-bonding layer 21, the length L and the width W of the thermal-fusion-bonding part 20S, and the sealing ratio R satisfy the condition described above.

In this manner, the battery device 10 is sealed in the outer package film 20 having the pouch shape. As a result, the secondary battery is assembled.

The secondary battery after being assembled is charged and discharged. Various conditions including, for example, an environment temperature, the number of times of charging and discharging (the number of cycles), and charging and discharging conditions, may be set as desired. This process forms a film on a surface of, for example, the negative electrode 12. This brings the secondary battery into an electrochemically stable state. The secondary battery including the outer package film 20, that is, the secondary battery of the laminated-film type, is thus completed.

According to the secondary battery, the outer package film 20 (in which the thermal-fusion-bonding layer 21 includes polypropylene) having flexibility contains the battery device 10 (in which the solvent of the electrolytic solution includes the chain carboxylic acid ester) therein, and is sealed at the thermal-fusion-bonding part 20S. Further, the thickness T is within the range from 25 μm to 60 μm both inclusive, the length L is within the range from 160 mm to 650 mm both inclusive, the width W is within the range from 3 mm to 6 mm both inclusive, the sealing ratio R is within a range from 0.16 to 0.32 both inclusive, the drawn amount Q is less than or equal to 7.8 mm, and the content of the chain carboxylic acid ester in the solvent is within the range from 30 vol % to 60 vol % both inclusive.

In this case, as described above, the respective configurations of the thermal-fusion-bonding layer 21 and the thermal-fusion-bonding part 20S (the thickness T, the length L, the width W, and the sealing ratio R) and the content of the chain carboxylic acid ester are made appropriate with respect to each other, and the three-dimensional shape of the outer package film 20 (the upper film 20X having the depression part 20U) is also made appropriate. Thus, even if the electrolytic solution includes the chain carboxylic acid ester, permeation of the chain carboxylic acid ester into the thermal-fusion-bonding part 20S (the thermal-fusion-bonding layer 21) is suppressed. This suppresses degradation of the thermal-fusion-bonding layer 21, which prevents the liquid component and the gas component from passing through the thermal-fusion-bonding part 20S easily. Further, the outer package film 20 (the upper film 20X) is prevented from being easily deformed (molded) excessively, which prevents the outer package film 20 from being damaged or broken easily. This improves the hermetically closed property of the outer package film 20, which prevents the liquid component and the gas component from easily entering the inside of the outer package film 20.

In more detail, the liquid component such as water which is an external component is prevented from easily entering the inside of the outer package film 20, and is thus prevented from reacting easily with the electrolytic solution. This suppresses the gas generation due to the decomposition reaction of the electrolytic solution, which prevents the secondary battery from swelling easily.

Further, the gas component such as the volatile matter of the electrolytic solution which is an internal component is prevented from being released easily to the outside of the outer package film 20, which substantially prevents the electrolytic solution from being leaked easily. This makes it easier to maintain a storage quantity of the electrolytic solution contained inside the outer package film 20, and thus makes it easier for the charging and discharging reactions to proceed stably even if charging and discharging are repeated.

In addition, the positive electrode lead 14 is stably insulated from the metal layer 22 via the thermal-fusion-bonding layer 21, which prevents the short circuit between the positive electrode lead 14 and the metal layer 22 from occurring easily. In addition, the negative electrode lead 15 is stably insulated from the metal layer 22 via the thermal-fusion-bonding layer 21, which prevents the short circuit between the negative electrode lead 15 and the metal layer 22 from occurring easily. Thus, the insulation between the positive electrode lead 14 and the metal layer 22 is secured, and the insulation between the negative electrode lead 15 and the metal layer 22 is also secured.

Based upon the above, the sealing property of the outer package film 20 having flexibility is secured even if the electrolytic solution includes the chain carboxylic acid ester. This prevents a discharge capacity from decreasing easily and the secondary battery from swelling easily even if charging and discharging are repeated, while the insulating property is secured. Accordingly, it is possible to achieve a superior cyclability characteristic, a superior swelling characteristic, and a superior insulating characteristic.

In particular, the outer package film 20 may be a laminated film including the thermal-fusion-bonding layer 21. This further improves the sealing property of the outer package film 20. Accordingly, it is possible to achieve higher effects.

In this case, the laminated film may have a multilayer structure in which the thermal-fusion-bonding layer 21, the metal layer 22, and the protective layer 23 which has an insulating property are stacked in this order. This still further improves the sealing property of the outer package film 20. Accordingly, it is possible to achieve further higher effects.

Further, the secondary battery may include a lithium-ion secondary battery. This makes it possible to obtain a sufficient battery capacity stably through the use of insertion and extraction of lithium. Accordingly, it is possible to achieve higher effects.

Next, a description is given of modifications of the above-described secondary battery according to an embodiment. The configuration of the secondary battery is appropriately modifiable as described below. Note that any two or more of the following series of modifications may be combined with each other.

In FIG. 4, the outer package film 20 (each of the upper film 20X and the lower film 20Y) is a laminated film having a three-layer structure (the thermal-fusion-bonding layer 21, the metal layer 22, and the protective layer 23). However, the layer structure of the outer package film 20 is not particularly limited as long as the outer package film 20 includes the thermal-fusion-bonding layer 21. In other words, the number of layers included in the outer package film 20 is not limited to three including the thermal-fusion-bonding layer 21, and may be only one which is the thermal-fusion-bonding layer 21, may be two including the thermal-fusion-bonding layer 21, or may be four or more including the thermal-fusion-bonding layer 21. In those cases also, it is possible to achieve similar effects.

The separator 13 which is a porous film is used. However, although not specifically illustrated here, a separator of a stacked type including a polymer compound layer may be used instead of the separator 13 which is the porous film.

Specifically, the separator of the stacked type includes a porous film having two opposed surfaces, and a polymer compound layer disposed on one of or each of the two opposed surfaces of the porous film. A reason for this is that adherence of the separator to each of the positive electrode 11 and the negative electrode 12 improves to suppress the occurrence of misalignment of the battery device 10. This prevents the secondary battery from swelling easily even if, for example, the decomposition reaction of the electrolytic solution occurs. The polymer compound layer includes a polymer compound such as polyvinylidene difluoride. A reason for this is that the polymer compound such as polyvinylidene difluoride has superior physical strength and is electrochemically stable.

Note that the porous film, the polymer compound layer, or both may each include one or more kinds of insulating particles. A reason for this is that the insulating particles dissipate heat upon heat generation by the secondary battery, thus improving safety or heat resistance of the secondary battery. Examples of the insulating particles include inorganic particles and resin particles. Although not particularly limited in kind, specific examples of the inorganic particles include particles of: aluminum oxide, aluminum nitride, boehmite, silicon oxide, titanium oxide, magnesium oxide, and zirconium oxide. Although not particularly limited in kind, specific examples of the resin particles include particles of acrylic resin and particles of styrene resin.

In a case of fabricating the separator of the stacked type, a precursor solution including, without limitation, the polymer compound and an organic solvent is prepared, following which the precursor solution is applied on one of or each of the two opposed surfaces of the porous film. In this case, the insulating particles may be added to the precursor solution on an as-needed basis.

In the case where the separator of the stacked type is used also, lithium ions are movable between the positive electrode 11 and the negative electrode 12, and similar effects are therefore obtainable.

The electrolytic solution which is a liquid electrolyte is used. However, although not specifically illustrated here, an electrolyte layer which is a gel electrolyte may be used instead of the electrolytic solution.

In the battery device 10 including the electrolyte layer, the positive electrode 11 and the negative electrode 12 are stacked on each other with the separator 13 and the electrolyte layer interposed therebetween, and the stack of the positive electrode 11, the negative electrode 12, the separator 13, and the electrolyte layer is wound. The electrolyte layer is interposed between the positive electrode 11 and the separator 13, and between the negative electrode 12 and the separator 13.

Specifically, the electrolyte layer includes a polymer compound together with the electrolytic solution. The electrolytic solution is held by the polymer compound in the electrolyte layer. The configuration of the electrolytic solution is as described above. The polymer compound includes, for example, polyvinylidene difluoride. In a case of forming the electrolyte layer, a precursor solution including, for example, the electrolytic solution, the polymer compound, and an organic solvent is prepared, following which the precursor solution is applied on one side or both sides of the positive electrode 11 and on one side or both sides of the negative electrode 12.

In a case where the electrolyte layer is used also, lithium ions are movable between the positive electrode 11 and the negative electrode 12 via the electrolyte layer, and similar effects are therefore obtainable.

Next, a description is given of applications (application examples) of the above-described secondary battery.

The applications of the secondary battery are not particularly limited. The secondary battery used as a power source may serve as a main power source or an auxiliary power source of, for example, electronic equipment and an electric vehicle. The main power source is preferentially used regardless of the presence of any other power source. The auxiliary power source is used in place of the main power source, or is switched from the main power source.

Specific examples of the applications of the secondary battery include: electronic equipment including portable electronic equipment; apparatuses for data storage; electric power tools; battery packs to be mounted on, for example, electronic equipment; medical electronic equipment; electric vehicles; and electric power storage systems. Examples of the electronic equipment include video cameras, digital still cameras, mobile phones, laptop personal computers, headphone stereos, portable radios, and portable information terminals. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems or industrial battery systems for accumulation of electric power for a situation such as emergency. The above-described applications may each use one secondary battery, or may each use multiple secondary batteries.

The battery packs may each include a single battery, or may each include an assembled battery. The electric vehicle is a vehicle that operates (travels) using the secondary battery as a driving power source, and may be a hybrid automobile that is additionally provided with a driving source other than the secondary battery, as described above. In an electric power storage system for home use, electric power accumulated in the secondary battery which is an electric power storage source may be utilized for using, for example, home appliances.

An application example of the secondary battery will now be described in detail. The configuration of the application example described below is merely an example, and is appropriately modifiable.

Figure 5:
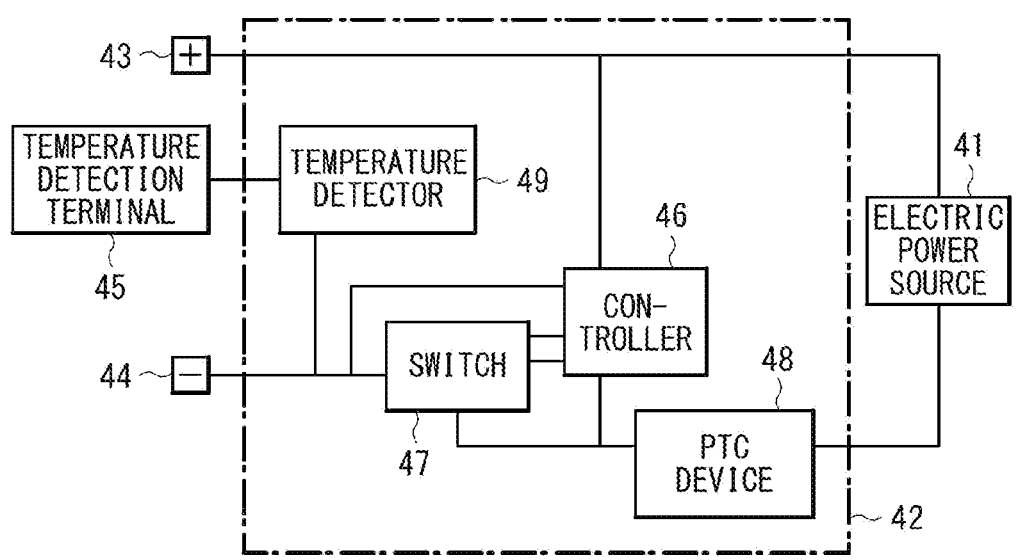
FIG. 5 is a block diagram illustrating a configuration of an application example of the secondary battery.

FIG. 5 illustrates a block configuration of a battery pack. The battery pack described here is a battery pack (a so-called soft pack) including one secondary battery, and is to be mounted on, for example, electronic equipment typified by a smartphone.

As illustrated in FIG. 5, the battery pack includes an electric power source 41 and a circuit board 42. The circuit board 42 is coupled to the electric power source 41, and includes a positive electrode terminal 43, a negative electrode terminal 44, and a temperature detection terminal 45.

The electric power source 41 includes one secondary battery. The secondary battery has a positive electrode lead coupled to the positive electrode terminal 43 and a negative electrode lead coupled to the negative electrode terminal 44. The electric power source 41 is couplable to outside via the positive electrode terminal 43 and the negative electrode terminal 44, and is thus chargeable and dischargeable. The circuit board 42 includes a controller 46, a switch 47, a thermosensitive resistive device (a positive temperature coefficient (PTC) device) 48, and a temperature detector 49. However, the PTC device 48 may be omitted.

The controller 46 includes, for example, a central processing unit (CPU) and a memory, and controls an overall operation of the battery pack. The controller 46 detects and controls a use state of the electric power source 41 on an as-needed basis.

If a voltage of the electric power source 41 (the secondary battery) reaches an overcharge detection voltage or an overdischarge detection voltage, the controller 46 turns off the switch 47. This prevents a charging current from flowing into a current path of the electric power source 41. The overcharge detection voltage and the overdischarge detection voltage are not particularly limited. For example, the overcharge detection voltage is 4.2 V±0.05 V and the overdischarge detection voltage is 2.4 V±0.1 V.

The switch 47 includes, for example, a charge control switch, a discharge control switch, a charging diode, and a discharging diode. The switch 47 performs switching between coupling and decoupling between the electric power source 41 and external equipment in accordance with an instruction from the controller 46. The switch 47 includes, for example, a metal-oxide-semiconductor field-effect transistor (MOSFET). The charging and discharging currents are detected on the basis of an ON-resistance of the switch 47.

The temperature detector 49 includes a temperature detection device such as a thermistor. The temperature detector 49 measures a temperature of the electric power source 41 using the temperature detection terminal 45, and outputs a result of the temperature measurement to the controller 46. The result of the temperature measurement to be obtained by the temperature detector 49 is used, for example, in a case where the controller 46 performs charge/discharge control upon abnormal heat generation or in a case where the controller 46 performs a correction process upon calculating a remaining capacity.

EXAMPLES

A description is given of Examples of the present technology below according to an embodiment.

Examples 1 to 20 and Comparative Examples 1 to 15

Secondary batteries (lithium-ion secondary batteries) of the laminated-film type illustrated in FIGS. 1 to 4 were fabricated, following which the secondary batteries were each evaluated for performance as described below.
[Fabrication of Secondary Battery]

The secondary batteries were fabricated in accordance with the following procedure.
[Fabrication of Positive Electrode]

First, 91 parts by mass of the positive electrode active material (lithium cobalt oxide ($LiCoO_2$)), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into a solvent (N-methyl-2-pyrrolidone which is the organic solvent), following which the solvent was stirred to thereby prepare a paste positive electrode mixture slurry. Thereafter, the positive electrode mixture slurry was applied on the two opposed surfaces of the positive electrode current collector 11A (a band-shaped aluminum foil having a thickness of 12 nm) by means of a coating apparatus, following which the applied positive electrode mixture slurry was dried to thereby form the positive electrode active material layers 11B. Lastly, the positive electrode active material layers 11B were compression-molded by means of a roll pressing machine. In this manner, the positive electrode active material layers 11B were formed on the respective two opposed surfaces of the positive electrode current collector 11A. The positive electrode 11 was thus fabricated.
[Fabrication of Negative Electrode]

First, 93 parts by mass of the negative electrode active material (artificial graphite which is the carbon material) and 7 parts by mass of the negative electrode binder (polyvinylidene difluoride) were mixed with each other, to thereby obtain a negative electrode mixture. Thereafter, the negative electrode mixture was put into a solvent (N-methyl-2-pyrrolidone which is the organic solvent), following which the solvent was stirred to thereby prepare a paste negative electrode mixture slurry. Thereafter, the negative electrode mixture slurry was applied on the two opposed surfaces of the negative electrode current collector 12A (a band-shaped copper foil having a thickness of 15 μm) by means of a coating apparatus, following which the applied negative electrode mixture slurry was dried to thereby form the negative electrode active material layers 12B. Lastly, the negative electrode active material layers 12B were compression-molded by means of the roll pressing machine. In this manner, the negative electrode active material layers 12B were formed on the respective two opposed surfaces of the negative electrode current collector 12A. The negative electrode 12 was thus fabricated.
[Preparation of Electrolytic Solution]

The electrolyte salt (lithium hexafluorophosphate ($LiPF_6$)) was added to the solvent, following which the solvent was stirred. Used as the solvent were ethylene carbonate which is the carbonic-acid-ester-based compound (the cyclic carbonic acid ester), and propyl propionate (PP) which is the chain carboxylic acid ester. A mixture ratio (a volume ratio) of the solvent was measured by an ICP optical emission spectroscopy after the secondary battery was completed, as described below. A content of the electrolyte salt was set to 1 mol/kg with respect to the solvent. Thus, the electrolyte salt was dispersed or dissolved in the solvent. In such a manner, the electrolytic solution was prepared.
(Assembly of Secondary Battery)

First, the positive electrode lead 14 including aluminum was welded to the positive electrode 11 (the positive electrode current collector 11A) and the negative electrode lead 15 including copper was welded to the negative electrode 12 (the negative electrode current collector 12A).

Thereafter, the positive electrode 11 and the negative electrode 12 were stacked on each other with the separator 13 (a fine-porous polyethylene film having a thickness of 15 μm) interposed therebetween, following which the stack of the positive electrode 11, the negative electrode 12, and the separator 13 was wound to thereby fabricate the wound body. Thereafter, the wound body was pressed by means of a pressing machine to thereby shape the wound body into an elongated shape.

Thereafter, the upper film 20X having the depression part 20U, and the lower film 20Y were prepared as the outer package film 20. Used as each of the upper film 20X and the lower film 20Y was an aluminum laminated film in which the thermal-fusion-bonding layer 21 (a polypropylene film having the thickness T), the metal layer 22 (an aluminum foil having a thickness of 40 μm), and the protective layer 23 (a nylon film having a thickness of 25 μm) were stacked in this order from the inner side. The thickness T (μm) of the thermal-fusion-bonding layer 21 and the drawn amount Q (mm) of the outer package film 20 (the upper film 20X) were as listed in Tables 1 and 2.

Thereafter, the wound body was placed inside the depression part 20U, following which the upper film 20X and the lower film 20Y were overlapped on each other in such a manner as to sandwich the wound body. Thereafter, the outer edge part of three sides of the upper film 20X (the thermal-fusion-bonding layer 21) and the outer edge part of three sides of the lower film 20Y (the thermal-fusion-bonding layer 21) were thermal-fusion-bonded to each other. Owing to the thermal-fusion-bonding part 20S being formed on the three sides, the outer package film 20 having the pouch shape was formed with use of the upper film 20X and the lower film 20Y. The wound body was thus contained inside the outer package film 20 having the pouch shape.

Lastly, the electrolytic solution was injected into the outer package film 20 having the pouch shape, following which the outer edge part of the remaining one side of the upper film 20X (the thermal-fusion-bonding layer 21) and the outer edge part of the remaining one side of the lower film 20Y (the thermal-fusion-bonding layer 21) were thermal-fusion-bonded to each other in a reduced-pressure environment. The wound body was thereby impregnated with the electrolytic solution. Thus, the battery device 10 was fabricated. The thermal-fusion-bonding part 20S of one side was further formed, and the thermal-fusion-bonding part 20S of four sides in total was thereby formed. Thus, the outer package film 20 having the pouch shape was sealed. The length L (mm) and the width W (mm) of the thermal-fusion-bonding part 20S were as listed in Tables 1 and 2. The battery device 10 was thereby sealed in the outer package film 20 having the pouch shape. As a result, the secondary battery was assembled.

In a case of forming the thermal-fusion-bonding part 20S, the sealing ratio R was adjusted as listed in Tables 1 and 2 by changing a range over which the upper film 20X and the lower film 20Y were to be thermal-fusion-bonded to each other.

(Stabilization of Secondary Battery)

The secondary battery was charged and discharged in an ambient temperature environment (at a temperature of 23° C.). Upon the charging, the secondary battery was charged with a constant current of 0.1 C until a battery voltage reached 4.2 V, and was thereafter charged with a constant voltage of 4.2 V until a current reached 0.05 C. Upon the discharging, the secondary battery was discharged with a constant current of 0.1 C until the battery voltage reached 3.0 V. Note that 0.1 C is a value of a current that causes a battery capacity (a theoretical capacity) to be completely discharged in 10 hours, and 0.05 C is a value of a current that causes the battery capacity to be completely discharged in 20 hours.

In this manner, a film was formed on the surface of, for example, the negative electrode 12, and the state of the secondary battery was thus stabilized. As a result, the secondary battery of the laminated-film type was completed.

Note that, after the secondary battery was completed, the electrolytic solution was analyzed by ICP optical emission spectroscopy to thereby measure the content (vol %) of the chain carboxylic acid ester in the solvent. The results thereof were as listed in Tables 1 and 2. In other words, as for the mixture ratio (the volume ratio) between ethylene carbonate and propyl propionate in the solvent was varied within a range from 80:20 to 30:70 both inclusive.

The cyclability characteristic, the swelling characteristic, and the insulating characteristic were evaluated as performance (the sealing property) of the secondary batteries (the outer package films 20), and the evaluation revealed the results presented in Tables 1 and 2.

In a case of examining the cyclability characteristic, first, the secondary battery was charged and discharged for one cycle in an ambient temperature environment (at a temperature of 23° C.), and a discharge capacity (a first-cycle discharge capacity) was measured. Thereafter, the secondary battery was repeatedly charged and discharged in the same environment until the number of cycles reached 100, and the discharge capacity (a 100th-cycle discharge capacity) was measured. Lastly, the following was calculated: capacity retention rate (%)=(100th-cycle discharge capacity/first-cycle discharge capacity)×100. Note that charging and discharging conditions were similar to those in stabilizing the secondary battery.

In a case of examining the swelling characteristic, first, the secondary battery was charged in an ambient temperature environment (at a temperature of 23° C.), following which a thickness (a pre-storage thickness) of the secondary battery was measured. Note that the charging condition was similar to that in stabilizing the secondary battery. Thereafter, the secondary battery was stored for a storing period of 90 days in a high-temperature and high-humidity environment (at a temperature of 60° C. and a humidity of 90%), following which the thickness (a post-storage thickness) of the secondary battery was measured again. Lastly, the following was calculated: swelling rate (%)=[(post-storage thickness−pre-storage thickness)/pre-storage thickness]× 100.

In a case of examining the insulating characteristic, a drop test was performed on the secondary battery, following which electric resistance (insulation resistance ($\Omega$)) of the secondary battery was measured. In accordance with a drop test defined by Electrical Appliances and Materials Safety Act, the secondary battery was dropped from a position at a height of 1.9 m onto a concrete floor.

In addition to evaluating the cyclability characteristic, the swelling characteristic, and the insulating characteristic, the battery capacity (Ah) of the secondary battery was also measured here, as indicated in Tables 1 and 2.

TABLE 1

| | Outer package film | | | | Electrolytic solution | | | | | |
|---|---|---|---|---|---|---|---|---|---|---|
| | Thickness T(μm) | Length L(mm) | Width W(mm) | Sealing ratio R | Drawn amount Q(mm) | Chain carboxylic acid ester | Content (vol %) | Capacity retention rate (%) | Swelling rate (%) | Insulation resistance ($\Omega$) | Battery capacity (Ah) |
| Comparative example 1 | 20 | 244 | 3 | 0.16 | 4.4 | PP | 50 | 88 | 3 | 200 k | 7 |
| Example 1 | 25 | 244 | 3 | 0.20 | 4.4 | PP | 50 | 85 | 4 | 1.9 M | 7 |
| Example 2 | 28 | 244 | 3 | 0.23 | 4.4 | PP | 50 | 88 | 2 | 1.7 M | 7 |
| Example 3 | 32 | 244 | 3 | 0.26 | 4.4 | PP | 50 | 87 | 4 | 1.7 M | 7 |
| Comparative example 2 | 40 | 244 | 3 | 0.33 | 4.4 | PP | 50 | 88 | 13 | 25 M | 7 |
| Example 4 | 52 | 244 | 4 | 0.32 | 4.4 | PP | 50 | 84 | 7 | 29 M | 7 |
| Comparative example 3 | 55 | 244 | 4 | 0.34 | 4.4 | PP | 50 | 74 | 15 | 3.2 M | 7 |
| Example 5 | 28 | 325 | 4 | 0.23 | 4.4 | PP | 50 | 88 | 4 | 3.4 M | 9 |
| Example 6 | 30 | 325 | 4 | 0.24 | 4.4 | PP | 50 | 89 | 4 | 24 M | 9 |

TABLE 1-continued

| | Outer package film | | | | Electrolytic solution | | Capacity retention rate (%) | Swelling rate (%) | Insulation resistance (Ω) | Battery capacity (Ah) |
|---|---|---|---|---|---|---|---|---|---|---|
| | Thickness T(μm) | Length L(mm) | Width W(mm) | Sealing ratio R | Drawn amount Q(mm) | Chain carboxylic acid ester | Content (vol %) | | | | |
| Comparative example 4 | 40 | 325 | 4 | 0.33 | 4.4 | PP | 50 | 78 | 13 | 26 M | 9 |
| Comparative example 5 | 49 | 325 | 4 | 0.40 | 4.4 | PP | 50 | 73 | 17 | 28 M | 9 |
| Comparative example 6 | 55 | 325 | 4 | 0.45 | 4.4 | PP | 50 | 71 | 18 | 3.3 M | 9 |
| Comparative example 7 | 40 | 440 | 4 | 0.44 | 4.4 | PP | 50 | 72 | 16 | 3.5 M | 11 |
| Comparative example 8 | 20 | 440 | 5 | 0.18 | 4.4 | PP | 50 | 87 | 3 | 200 k | 11 |
| Example 7 | 25 | 440 | 5 | 0.22 | 4.4 | PP | 50 | 87 | 3 | 1.7 M | 11 |
| Example 8 | 30 | 440 | 5 | 0.26 | 4.4 | PP | 50 | 89 | 3 | 21 M | 11 |
| Example 9 | 35 | 440 | 5 | 0.31 | 4.4 | PP | 50 | 84 | 5 | 28 M | 11 |

TABLE 2

| | Outer package film | | | | Electrolytic solution | | Capacity retention rate(%) | Swelling rate(%) | Insulation resistance (Ω) | Battery capacity (Ah) |
|---|---|---|---|---|---|---|---|---|---|---|
| | Thickness T(μm) | Length L(mm) | Width W(mm) | Sealing ratio R | Drawn amount Q(mm) | Chain carboxylic acid ester | Content (vol %) | | | | |
| Comparative example 9 | 20 | 560 | 5 | 0.22 | 4.4 | PP | 50 | 86 | 54 | 300 k | 13 |
| Example 10 | 25 | 560 | 5 | 0.28 | 4.4 | PP | 50 | 85 | 4 | 1.9 M | 13 |
| Comparative example 10 | 30 | 560 | 5 | 0.34 | 4.4 | PP | 50 | 75 | 17 | 1.9 M | 13 |
| Comparative example 11 | 40 | 560 | 5 | 0.45 | 4.4 | PP | 50 | 72 | 19 | 28 M | 13 |
| Comparative example 12 | 25 | 650 | 5 | 0.33 | 4.4 | PP | 50 | 76 | 12 | 1.9 M | 15 |
| Example 11 | 25 | 650 | 6 | 0.27 | 4.4 | PP | 50 | 86 | 3 | 25 M | 4 |
| Example 12 | 50 | 160 | 3 | 0.27 | 4.4 | PP | 50 | 85 | 3 | 23 M | 4 |
| Example 13 | 55 | 160 | 3 | 0.29 | 4.4 | PP | 50 | 85 | 2 | 26 M | 4 |
| Example 14 | 60 | 160 | 3 | 0.32 | 4.4 | PP | 50 | 83 | 6 | 3.3 M | 4 |
| Example 15 | 50 | 140 | 3 | 0.23 | 4.4 | PP | 50 | 88 | 4 | 27 M | 3 |
| Example 16 | 30 | 325 | 4 | 0.24 | 6.6 | PP | 50 | 85 | 4 | 25 M | 15 |
| Example 17 | 30 | 325 | 4 | 0.24 | 7.8 | PP | 50 | 85 | 6 | 24 M | 17 |
| Comparative example 13 | 30 | 325 | 4 | 0.24 | 8.5 | PP | 50 | 65 | 21 | 200 k | 19 |
| Comparative example 14 | 30 | 325 | 4 | 0.24 | 4.4 | PP | 20 | 89 | 22 | 26 M | 9 |
| Example 18 | 30 | 325 | 4 | 0.24 | 4.4 | PP | 30 | 88 | 6 | 3.3 M | 9 |
| Example 19 | 30 | 325 | 4 | 0.24 | 4.4 | PP | 40 | 88 | 4 | 26 M | 9 |
| Example 20 | 30 | 325 | 4 | 0.24 | 4.4 | PP | 60 | 84 | 2 | 23 M | 9 |
| Comparative example 15 | 30 | 325 | 4 | 0.24 | 4.4 | PP | 70 | 76 | 2 | 26 M | 9 |

As described in Tables 1 and 2, the capacity retention rate, the swelling rate, and the insulation resistance to be influenced by the sealing property of the secondary battery (the outer package film 20) each varied depending on a configuration (the thickness T, the length L, the width W, the sealing ratio R, and the drawn amount Q) of the outer package film 20 and a composition (the content of the chain carboxylic acid ester in the solvent) of the electrolytic solution.

Specifically, in a case where not all of the following six conditions were satisfied (Comparative examples 1 to 15), a trade-off relationship was exhibited in which improvement of any of the capacity retention rate, the swelling rate, and the insulation resistance caused degradation of the others. The six conditions were: the thickness T was within the range from 25 μm to 60 μm both inclusive; the length L was within the range from 160 mm to 650 mm both inclusive; the width W was within the range from 3 mm to 6 mm both inclusive; the sealing ratio R was within the range from 0.16 to 0.32 both inclusive; the drawn amount Q was less than or equal to 7.8 mm; and the content of the chain carboxylic acid ester was within the range from 30 vol % to 60 vol % both inclusive.

In contrast, in a case where all of the six conditions were satisfied (Examples 1 to 20), the trade-off relationship described above was overcome, which allowed for improvement of each of the capacity retention rate, the swelling rate, and the insulation resistance. In this case, a sufficient battery capacity was also achieved.

Based upon the results presented in Tables 1 and 2, if the outer package film 20 (in which the thermal-fusion-bonding layer 21 included polypropylene) having flexibility contained the battery device 10 (in which the solvent of the electrolytic solution included the chain carboxylic acid ester) therein, and was sealed at the thermal-fusion-bonding part 20S, and all of the six conditions described above were satisfied, the capacity retention rate increased and the swelling rate decreased while the insulation resistance was secured. Accordingly, the secondary battery achieved a superior cyclability characteristic, a superior swelling characteristic, and a superior insulating characteristic.

Although the present technology has been described above with reference to one or more embodiments including Examples, the configuration of the present technology is not limited thereto, and is therefore modifiable in a variety of ways.

Specifically, although the description has been given of the case where the battery device has a device structure of a wound type, the device structure of the battery device is not particularly limited, and may thus be of any other type, such as a stacked type in which the electrodes (the positive electrode and the negative electrode) are stacked or a zigzag folded type in which the electrodes (the positive electrode and the negative electrode) are folded in a zigzag manner.

Further, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited to those described herein. Accordingly, the present technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
    outer package members each having flexibility, the outer package members each including a thermal-fusion-bonding layer; and
    a battery device contained in an inside of the outer package members, the battery device including a positive electrode, a negative electrode, and an electrolytic solution, wherein
    the outer package members are sealed at a thermal-fusion-bonding part, the thermal-fusion-bonding part being formed by the thermal-fusion-bonding layers being thermal-fusion-bonded to each other,
    the thermal-fusion-bonding layer includes polypropylene,
    the electrolytic solution includes a solvent and an electrolyte salt,
    the solvent includes a chain carboxylic acid ester,
    the thermal-fusion-bonding layer has a thickness of greater than or equal to 25 micrometers and less than or equal to 60 micrometers,
    the thermal-fusion-bonding part has a length of greater than or equal to 160 millimeters and less than or equal to 650 millimeters,
    the thermal-fusion-bonding part has a width of greater than or equal to 3 millimeters and less than or equal to 6 millimeters,
    a dimensional ratio defined by the thickness of the thermal-fusion-bonding layer, the length of the thermal-fusion-bonding part, and the width of the thermal-fusion-bonding part satisfies a condition represented by Expression (1),
    a drawn amount of the outer package members is less than or equal to 7.8 millimeters, and
    a content of the chain carboxylic acid ester in the solvent is greater than or equal to 30 volume percent and less than or equal to 60 volume percent, $$0.16 \leq (T \times L)/W \leq 0.32 \tag{1}$$

where
    $(T \times L)/W$ is the dimensional ratio,
    T is the thickness in centimeters of the thermal-fusion-bonding layer,
    L is the length in centimeters of the thermal-fusion-bonding part, and
    W is the width in centimeters of the thermal-fusion-bonding part.

2. The secondary battery according to claim 1, wherein the outer package members are each a laminated film, the laminated film including the thermal-fusion-bonding layer.

3. The secondary battery according to claim 2, wherein the outer package members each have a multilayer structure in which the thermal-fusion-bonding layer, a metal layer, and a protective layer that has an insulating property are stacked in this order.

4. The secondary battery according to claim 1, wherein the secondary battery comprises a lithium-ion secondary battery.

* * * * *